United States Patent [19]
Hecht

[11] Patent Number: 5,901,224
[45] Date of Patent: May 4, 1999

[54] QUASI-REPROGRAPHICS WITH VARIABLE EMBEDDED DATA WITH APPLICATIONS TO COPYRIGHT MANAGEMENT, AND DISTRIBUTION CONTROL

[75] Inventor: David L. Hecht, Palo Alto, Calif.

[73] Assignee: Xerox Corporation, Stamford, Conn.

[21] Appl. No.: 08/734,570

[22] Filed: Oct. 21, 1996

[51] Int. Cl.⁶ ................................................. H04L 9/00
[52] U.S. Cl. .............................. 380/4; 380/51; 283/113; 399/366
[58] Field of Search ............................. 380/3, 4, 51, 54, 380/55, 23; 399/366, 84; 283/113; 382/100

[56] References Cited

U.S. PATENT DOCUMENTS

| | | | |
|---|---|---|---|
| 4,716,438 | 12/1987 | Farrell | 399/84 |
| 4,728,984 | 3/1988 | Daniele | 358/300 |
| 4,757,348 | 7/1988 | Rourke et al. | 364/525 |
| 5,128,525 | 7/1992 | Stearns et al. | 235/454 |
| 5,185,792 | 2/1993 | Shimada | 380/4 |
| 5,221,833 | 6/1993 | Hecht | 235/494 |
| 5,315,098 | 5/1994 | Tow | 235/494 |
| 5,444,779 | 8/1995 | Daniele | 380/3 |
| 5,449,895 | 9/1995 | Hecht et al. | 235/494 |
| 5,449,896 | 9/1995 | Hecht et al. | 235/494 |
| 5,486,686 | 1/1996 | Zdybel, Jr. et al. | 235/375 |
| 5,521,372 | 5/1996 | Hecht et al. | 235/494 |
| 5,635,694 | 6/1997 | Tuhro | 235/375 |
| 5,649,013 | 7/1997 | Stuckey et al. | 380/4 |
| 5,664,018 | 9/1997 | Leighton | 380/54 |
| 5,668,636 | 9/1997 | Beach et al. | 358/296 |

Primary Examiner—Gail O. Hayes
Assistant Examiner—Pinchus M. Laufer
Attorney, Agent, or Firm—Fay, Sharpe, Beall, Fagan, Minnich & McKe

[57] ABSTRACT

A method and apparatus for quasi-reprographically replicating a source document. The source document is digitized, appropriate locations for embedded code are detected, and any embedded code located in the digitized document along with the detected locations are forwarded to a decoder. The decoder forwards the decoded information to a control unit which processes this information and forwards it to a encoder whereafter it is inserted in the digitized document. The hardcopy replication of the source document being substantially visually identical to the source document, even though new or additional embedded machine-readable data has been added or existing data has been changed. The process occurs without intervention by an operator and without knowledge of the operator producing the replicated documents.

18 Claims, 8 Drawing Sheets

QUASI-REPROGRAPHICS WITH VARIABLE EMBEDDED DATA WITH APPLICATIONS TO COPYRIGHT MANAGEMENT, AND DISTRIBUTION CONTROL

BACKGROUND OF THE INVENTION

This invention relates generally to the copying of a source document on reprographic devices to thereby generate a replication of the source document, and more particularly to embedding and/or altering data during the replication process, whereby the replicated document is substantially visually identical to the source document.

The phrase "reprographic devices" is intended to mean devices which provide for the convenient hardcopy reproduction or replication of documents, whether the documents are in paper, other hardcopy, or electronic form prior to the reproduction, including photocopiers, electronic printers, digital copiers, telecopiers, spirit duplicators, and the like, being used to reproduce all types of documents. Since the replication of the source document to the replicated document results in a substantially visually identical document, while the machine readable non-visual aspects are altered, the process according to the subject invention is directed to a quasi-reprographics technology.

The modification of "reprographics" by "quasi", intended to differentiate the technology of the present invention from that of a standard reprographic device, such as described above. In particular, in existing reprographic devices the object is to generate an image which represents a source image that has been copied. The present invention provides such a benefit but goes beyond this intention by embedding data in a manner where the copied image is visually unaltered to the human eye, however, information whichis not detectable by the human eye may be added or changed within the image. Thus the use of "quasi" is intended to assist in describing the unique aspect of the present invention.

Plain paper still is a favored recording medium for storing and transferring human readable information. The emergence of electronic document processing systems making it evident that the functional utility of plain paper and other types of hardcopy documents may be enhanced significantly when the human readable information they normally convey is supplemented by writing appropriate machine readable digital data on them. This machine readable data enables the hardcopy document to actively interact with such a document processing system in a variety of different ways when the document is scanned into the system by an ordinary input scanner. See, for example, commonly assigned U.S. Pat. No. 5,486,686 of Frank Zdybel, Jr. et al. on "Hardcopy Lossless Data Storage and Communications for Electronic Document Processing Systems", and U.S. Pat. No. 5,060,980 of Walter A. L. Johnson, et al., entitled "Form and System Utilizing Encoded Indications for Form Field Processing", which are hereby incorporated by reference.

As a general rule, digital data is recorded by writing two dimensional marks on a recording medium in accordance with a pattern which encodes the data. Among the different types of codes used to encode data, self-clocking glyph codes are known to be suitable for transferring digital values of various types (e.g., machine control instructions, data values, memory pointers, and executable binaries) back and forth synchronously between the electronic and hardcopy domains. They, therefore, are a promising interface technology for integrating hardcopy documents and computer controlled electronic document processing systems more or less seamlessly.

A self-clocking glyph code typically is generated by mapping logically ordered digital input values of a predetermined bit length into a predefined set of graphically unique symbols (i.e., "glyphs"), each of which is preassigned to the encoding of a different one of the permissible input values. Thus, each of the input values is transformed into and encoded by a corresponding glyph. These glyph encodings, in turn, are written on a hardcopy recording medium in accordance with a predetermined spatial formatting rule, thereby producing a glyph code that encodes the input values and preserves their logical ordering.

As will be appreciated, a code of the foregoing type carries the clock signal that is required for transferring the encoded digital values from the hardcopy domain to the electronic domain synchronously. Every input value is represented by a corresponding glyph, so the clock is embedded in the spatial distribution of the logically ordered glyphs. This is why these codes are referred to as "self-clocking" glyph codes. It also is to be understood that the self-clocking characteristic of these codes increases their tolerance to the degradation they may suffer while being replicated by copiers and/or facsimile systems. See commonly assigned Bloomberg et al. U.S. Pat. No. 5,168,147 on "Binary Image Processing for Decoding Self-Clocking Glyph Shape Codes" which hereby is incorporated by reference.

Another of the known advantages of these self-clocking glyph codes is that they can be composed of glyphs that are graphically distinguished from each other by machine detectable characteristics that are not easily perceived by the human eye. Thus, these codes can be used for recording machine readable digital information on hardcopy documents, without significantly degrading the aesthetic quality of those documents. For instance, the glyphs can be written using inks that are virtually invisible to the human eye under normal lighting conditions. Even more remarkably, glyphs written using visible inks, such as standard xerographic toners, can be of such small uniform size and written at a sufficiently high spatial density that the resulting glyph code has a generally uniform textured appearance to the human eye.

As pointed out in the aforementioned Bloomberg et al. patent (U.S. Pat. No. 5,168,147), digital values can be encoded in the rotation or profiles of such glyphs if the glyphs are rotationally variant or invariant, respectively. Also see Rob F. Tow, U.S. Pat. No. 5,315,098 on "Method and Means for Embedding Machine Readable Digital Data in Halftone Images", hereby incorporated by reference.

In addition to the aforementioned glyph codes, other codes such as serpentine codes can be embedded into documents such that they are imperceptible to the unaided human eye.

Zdybel, Jr. et al. U.S. Pat. No. 5,486,686, makes provision in electronic document processing systems for printing machine readable digital representations of electronic documents and human readable renderings of them on the same recording media using the same printing process. The integration of machine readable digital representations of electronic documents with the human readable hardcopy renderings of them being made not only to enhance the precision with which the structure and content of such electronic documents can be recovered by scanning such hardcopies into electronic document processing systems, but also as a mechanism for enabling recipients of scanned-in versions of such documents to identify and process annotations that were added to the hardcopies after they were printed and/or for alerting the recipients of the scanned-in documents to alterations that may have been made to the original human readable content of the hardcopy renderings.

Such a printing system typically includes sufficient capabilities to allow a user to create, edit and print human readable hardcopy renderings of electronic documents from the system. Therefore, Zdybel, Jr., U.S. Pat. No. 5,486,686, is directed to the creation and editing of documents as opposed to the reprographic arts, which takes a document existing in a fixed form and creates a replica thereof which is substantially visually identical to the original.

Daniele, U.S. Pat. No. 5,444,779, on "Electronic Copyright Royalty Accounting System for Using Glyphs", which is incorporated by reference, discloses a system for utilizing a printable, yet unobtrusive glyph or similar two-dimensionally encoded mark to identify copyrighted documents. Upon attempting to reproduce such a document, a glyph is detected, decoded and used to accurately collect and/or record a copyright royalty for the reproduction of the document or to prevent such reproduction. Furthermore, the glyph may also include additional information so as to enable an electronic copyright royalty accounting system, capable of interpreting the encoded information to track and/or account for copyright royalties which accrue during reproduction of all or portions of the original document.

It is noted that in a lens copier, the reprinting of the glyph in an original document would be accomplished during the normal reproduction of the document. When the original document is being reproduced from a digital image, assuming the glyph information was separable from the content portion of the document, the glyph portion could be printed anew in response to a re-coding of the decoded glyph information. Further, it is suggested new information could also be added in this manner.

While Daniele, U.S. Pat. No. 5,444,779, does discuss the reprographic generation of a document having human readable data as well as electronic readable data in the same document, Daniele only suggests such reproduction to a document which has glyph data previously embedded. Also, as to the suggestion in Daniele of adding additional glyph information to the document, such an addition would increase the glyph encoded area thereby perceptively altering the reproduced document. Further, this patent teaches that the two-dimensional code, such as the glyph code, is to be located in a predetermined position on the document sheet, particularly side or bottom margins are suggested. However, under this teaching when, innocently or with intent, the border areas are not copied, the reproduced document will not hold any embedded machine readable data.

Consequently, it will be evident that it would be a significant improvement in the reproduction of documents if it were possible to quasi-reprographically replicate a source document configured with either no embedded data or selected areas of embedded data such that embedded data is added or existing embedded data is altered while the replicated document is visually substantially identical to the source document. It would further be beneficial to quasi-reprographically replicate a source document containing embedded data, where the embedded data is replaced by newly generated data, and the data is added such that a predefined embedded data area is substantially identical to the human eye, and where during the quasi-reprographic process, selection of appropriate areas for the embedding of data are determined.

SUMMARY OF THE INVENTION

Therefore, in accordance with the present invention, an apparatus and method is provided for quasi-reprographically replicating a source document having or not having embedded machine readable data, wherein the apparatus scans the source document into a digitized bit map, which is then examined for embedded machine readable data and/or for an area suitable for insertion of the embedded data, such as glyph codes. The apparatus codes new data which is to be inputted, and inserts the coded data into the digitized source document at an appropriate location. Thereafter, a hardcopy of the source document is replicated, including the newly added embedded machine readable data, such that the replicated document is substantially visually identical to human viewing.

In accordance with another aspect of the present invention, for quasi-reprographic reproduction of a source document having previously embedded data, the apparatus determines whether located embedded data should be replaced, changed, or additional data added. Any replacement change or additional data, is coded and inserted at an appropriate location.

In accordance with a more limited aspect of the subject invention, it is further determined whether there is sufficient space in an area of the document appropriate for the new or additional embedded data. When it is determined there is sufficient space, the new or additional embedded data is added to the bit map and a replica document is generated. When it is determined that there is not sufficient space, steps are taken to insure the replicated image is substantially visually identical to the human eye as the source document.

In accordance with another more limited aspect of the subject invention, to insure the replicated document is substantially visually identical to the source image, when the area for the embedded data is greater than the existing appropriate area, the amount of error correction material in the embedded data area is reduced. Alternatively, a pointer is encoded into the replicated document which points to a storage area where the additional information is located. Still another manner of maintaining the appearance of the replicated document is the printing of an appendage document with supplementary data, based on an encoded pointer on the replicated document.

With yet attention to another aspect of the present invention, there is provided quasi-reprographic printing apparatus which generates a digital watermark having a human readable portion, which may be altered with each replication, and a machine readable portion.

BRIEF DESCRIPTION OF THE DRAWINGS

Additional features and advantages of this invention will become apparent when the following detailed description is read in conjunction with the attached drawings, in which.

DETAILED DESCRIPTION OF THE PREFERRED EMBODIMENTS

While the invention is described in detail herein below with specific reference to an illustrated embodiment and certain applications, it is to be understood that there is no intent to limit to that embodiment or those applications. On the contrary, the aim is to cover all modifications, alternatives and equivalents falling within the spirit and scope of the invention as defined by the appended claims.

The present invention is particularly applicable to use with an electronic reprographic machine. The configuration and operation of such machines are well-known in the art. One example of such machine is described in substantial detail in the referenced Daniele, U.S. Pat. No. 4,728,984, on "Data Handling and Archiving System", which is incorporated herein by reference.

Figure 1:
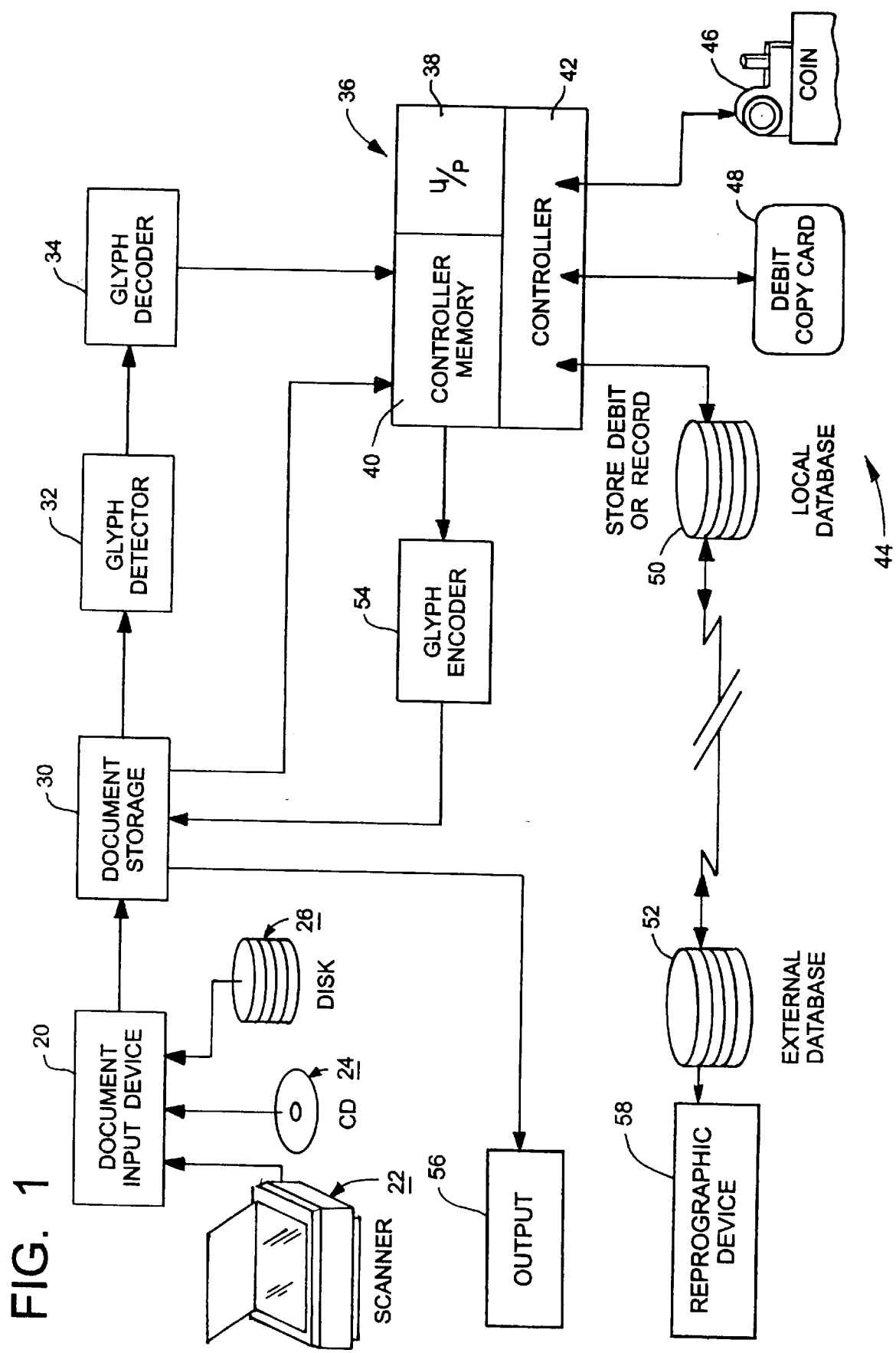
FIG. 1 illustrates a proposed architecture for a quasi-reprographic system according to the subject invention.

FIG. 1 shows a possible architecture of the quasi-reprographic system according to the subject invention, which may be implemented, in one embodiment, as part of the digital printing device of Daniele. It is to be appreciated, however, that the teachings of the subject invention may be implemented in a reprographic system having features different from that disclosed in Daniele.

With that in mind, returning attention to FIG. 1, the apparatus depicted includes a number of primary components which will be described in detail. First, the apparatus includes a document input device 20 which may include one or more of the following well-known devices: a digital image scanner 22 (e.g., a flatbed scan or a facsimile device), a disk reader 24 having a digital representation of a document on removable media (CD, floppy disk, rigid disk, tape, etc.) therein, or a hard disk 26 having one or more document images recorded thereon. Generally, the apparatus is intended to work with any device suitable for reprographically replicating a digitized representation of a document.

Once the document has been represented in a digitized form, and stored as a bit map in document storage 30, glyph detector 32 is employed to determine if the digitized document contains any embedded data. As described in the commonly assigned U.S. patents and application, to Dan S. Bloomberg et al., U.S. Pat. No. 5,168,147 on "Self-Clocking Glyph Codes"; Xiao Bei Zhang, U.S. Pat. No. 5,245,165 on "Self-Clocking Glyph Codes for Encoding Dual Bit Digital Values Robustly"; David L. Hecht et al., U.S. Ser. No. 08/186,212 on "Self-Clocking Glyph Code Having Composite Glyphs for Distributively Encoding Multi-Bit Digital Values"; Richard G. Sterns et al., U.S. Pat. No. 5,128,525 on "Convolution Filtering for Decoding Self-Clocking Glyph-Shaped Codes"; David L. Hecht et al., U.S. Pat. No. 5,449,895 on "Explicit Synchronization for SelfClocking Glyph Codes"; David L. Hecht et al., U.S. Pat. No. 5,521,372 on "Framing Codes for Robust Synchronization and Addressing of Self-Clocking Glyph Codes"; David L. Hecht et al., U.S. Pat. No. 5,449,896 on "Random Access Techniques for Use With Self-Clocking Glyph Codes"; and David L. Hecht, U.S. Pat. No. 5,221,833 on "Methods and Means for Reducing Bit Error Rates in Reading Self-Clocking Glyph Codes"; all of which are hereby incorporated by reference for their teachings.

Data may be represented on a document in an unobtrusive manner using multi-bit binary data symbols encoded in a two-dimensional code such as the self-clocking glyph code, which as described in the above-discussed patent, faithfully preserves the logical ordering of the bits that are encoded in its glyphs because the glyphs are written onto and read from a suitable recording medium in a known order and in compliance with a predetermined spatial formatting rule. Furthermore, such a code also provides the sample clock that is needed for decoding it because every bit that is encoded by the code is explicitly represented by a glyph, either alone in the case of a single bit per glyph code, or in combination with one or more additional bits in the case of a multiple bit per glyph code.

Glyph detector 32 analyzes the scanned or synthetic bit map image in accordance with the teachings of the incorporated above-cited patents. During this analysis, glyph detector 32 scans for suitable areas for the insertion of embedded data. In the case of glyphs, this may involve analyzing the gray level, and texture and the segmentation and recognition of glyph patterns. Input documents represented via page descriptional language may be analyzed for defined suitable regions; e.g., halftones, stipples, glyph blocks. Such an example would be a cover sheet form with predefined graphics containing a fixed stipple.

Glyph codes detected by glyph detector 32 are decoded by glyph decoder 34 in accordance with known techniques including those teachings found in the patents and applications cited and incorporated herein. This information is passed to a control unit 36 which includes microprocessor 38, controller memory 40 and controller 42. Data input 44 provides external data to controller unit 36. The data input 44 may be one of numerous devices including a coin entry system 46, debit copy card 48, local database 50, or external database 52 having a communication channel with control unit 36.

Controller unit 36 reads the decoded glyph codes from glyph code decoder 34 as well as data regarding the location of the detected glyph codes in the bit map. This information is processed in accordance with instructions stored in control unit 36, which selectively uses data received through data input 44 and data stored in controller memory 40. The results of this processing, along with information as to the proper location for the insertion of the embedded code in bit map storage 30, are transmitted to glyph encoder 54. The instruction stored in control unit 36, can include instructions to add new data to the existing embedded data as well as instructions to remove or change the existing embedded data. This information is then encoded in accordance with known techniques including those teachings found in the patents cited and incorporated herein, and stored at the appropriate location in the bit map stored in document storage 30.

The newly embedded data, along with previously existing and/or changed embedded data, is then generated at output 56 as a hardcopy document having both machine readable data and human readable data, and being substantially visually identical to the source document when viewed by the human eye.

Alternatively, the bit map data stored in document storage 30 may be maintained in electronic form and placed on a network through local database 50 which is in communication with external database 52 that may be part of a communication system having a remote reprographic device 58. Using known technologies, data may be sent to the communication system where a hardcopy of the source document is replicated by remote reprographic device 58.

In an embodiment where the scanned-in document stored in document storage 30 is found by glyph detector 32 to contain no glyph codes, glyph decoder 34 provides data to control section 36 that no glyph codes were located. Glyph code detector 32 also forwards data as to locations in the bit map acceptable for the placement of a glyph code. In this embodiment, control unit 36 forwards data to glyph encoder 54, including the location for storage of glyph codes, and glyph encoder 54 encodes and inserts this data at a location determined to be appropriate for the glyph code. Thereafter, at output 56 a replicated document of the source document is quasi-reprographically generated, containing both machine readable and human readable data. Alternatively, a replicated document may be generated by remote reprographic device 58, as previously discussed.

It is to be appreciated that the above discussed adding and/or changing the embedded data is accomplished in an automatic manner, without requiring interaction of a user. Rather, to the user it appears what is taking place is simply a known copying operation by for example a known copy machine, printer, etc. It is also noted that the concept of changing of embedded data is intended to include removing embedded data from the document.

Figure 2:
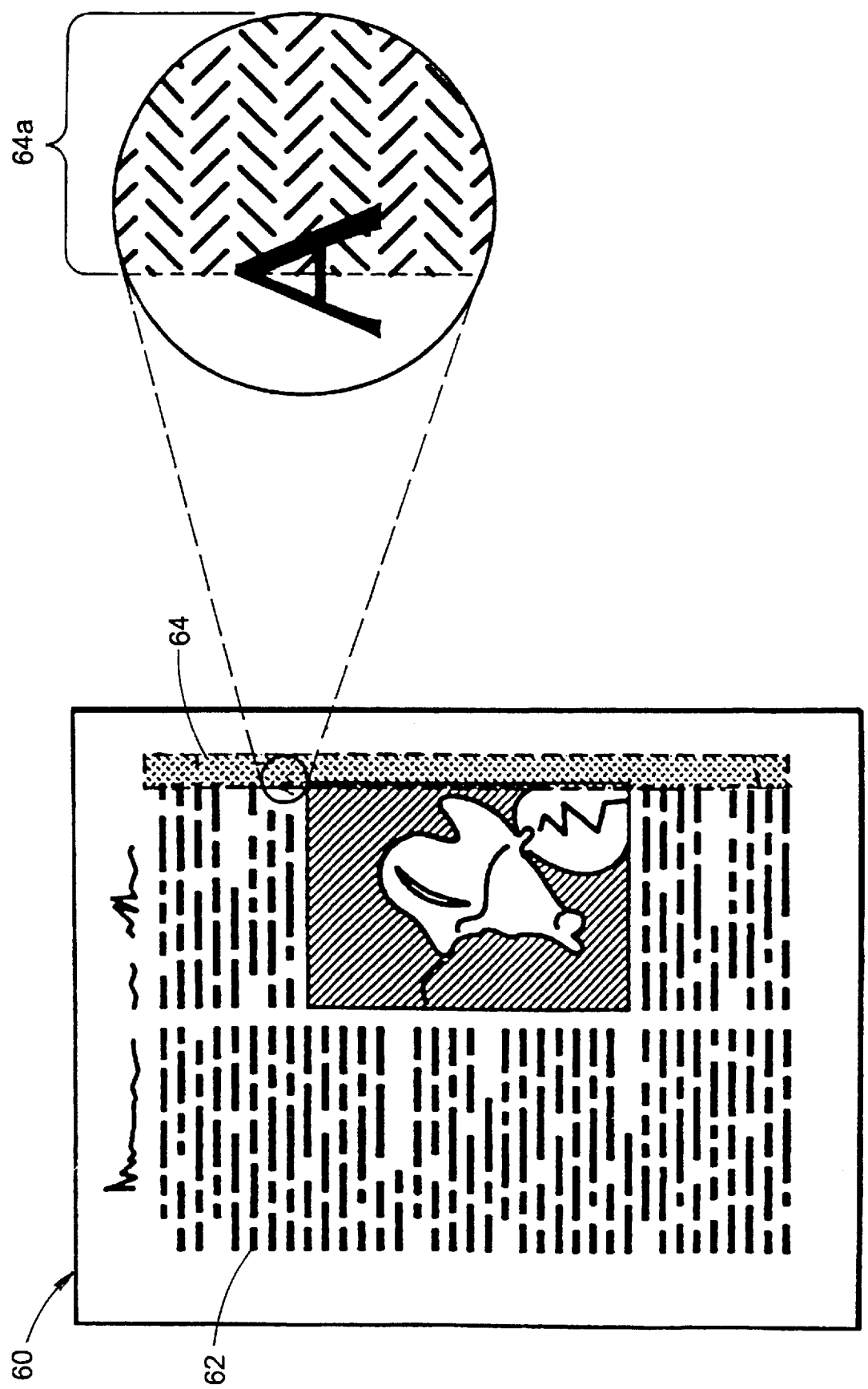
FIG. 2 illustrates a source document used in the present quasi-reprographic system.
Figure 3:
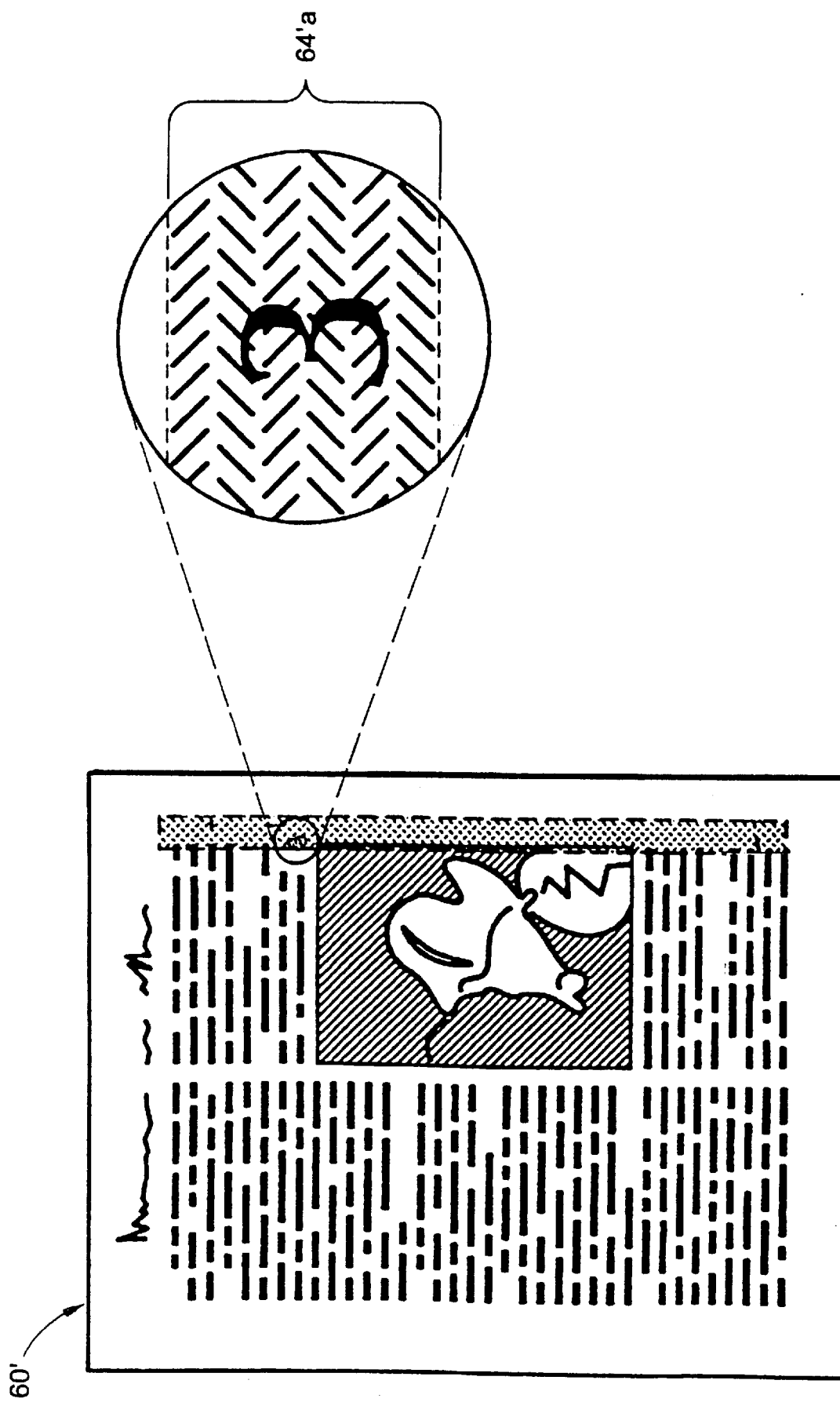
FIG. 3 illustrates a replication of the source document of FIG. 2.

According to the teachings of the present invention, and with attention to FIGS. 2 and 3, in FIG. 2 document 60 includes human readable data 62 and machine readable data 64. Document 60 may be considered a source document which is scanned into the quasi-reprographic apparatus of FIG. 1. According to a first embodiment, following processing discussed above, FIG. 3 illustrates a document 60' which is generated at output 56 or remote reprographic device 58, and is substantially visually identical to source document 60. However, in exploded sections 64a and 64'a, it is illustrated that the glyph code for "A" of FIG. 2 has been replaced with a glyph code for "3", in FIG. 3. Thus, by the teachings of the present invention, the glyph code of the source document 60 is altered in replicated document 60' while the visual appearance of the replicated document 60' is maintained visually identical to source document 60. It is to be appreciated that instead of replacing the "A" glyph code data can also be added thereto.

With attention to an aspect of the first embodiment, when glyph code data is added to a document already containing a glyph code and there is insufficient acceptable glyph code capacity on the document, the present invention inserts a pointer in the replicated document and the additional data is stored in a storage area such as controller memory 40 of control unit 36. The glyph encoded pointer embedded on the replicated document 60' is configured to point to a location in controller memory 40.

Alternatively, the pointer encoded in a copy of the source document can be configured to cause the electronic reprographic apparatus to print an appendage document, including the supplementary data.

As a third alternative, control unit 36 may reduce the amount of error correction data within the glyph area to maintain the appearance of the replicated document 60' substantially identical to source document 60.

Figure 4:
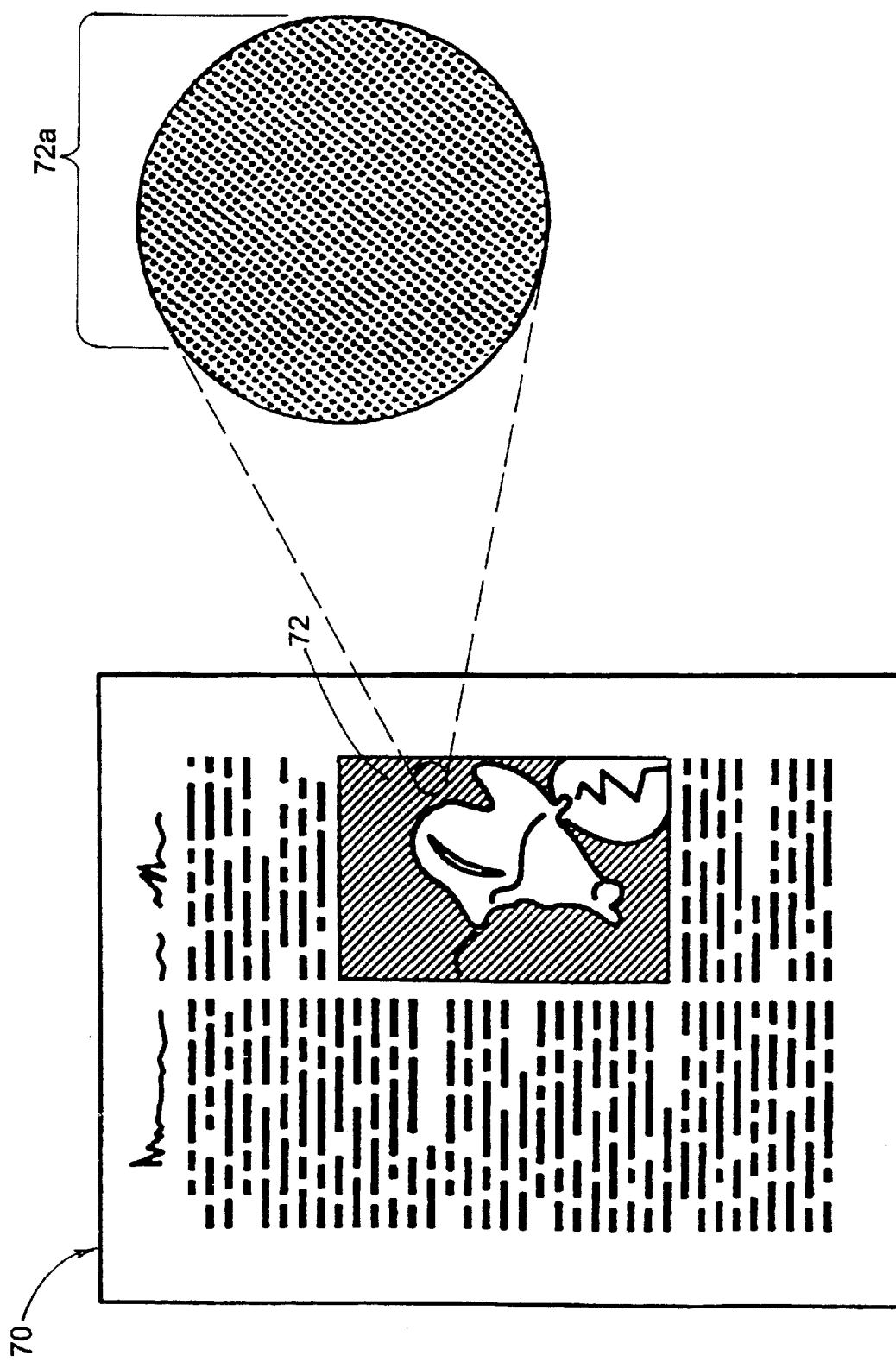
FIG. 4 is another scanned in source document used in the quasi-reprographic system of the subject invention.

With attention to a second embodiment, scanned-in source document 70 of FIG. 4 has no glyph code data, i.e, for example, it is a document comprised fully of halftone code, an analog color image or other image having no embedded code. This situation is illustrated in FIG. 4 by exploded section 72a, which shows that image 72 is a dot-matrix configuration. Using the teachings set forth above, the replicated document 70' of FIG. 5 will have embedded, a desired glyph code 72a' at a location determined to be appropriate by glyph detector 32.

Figure 5:
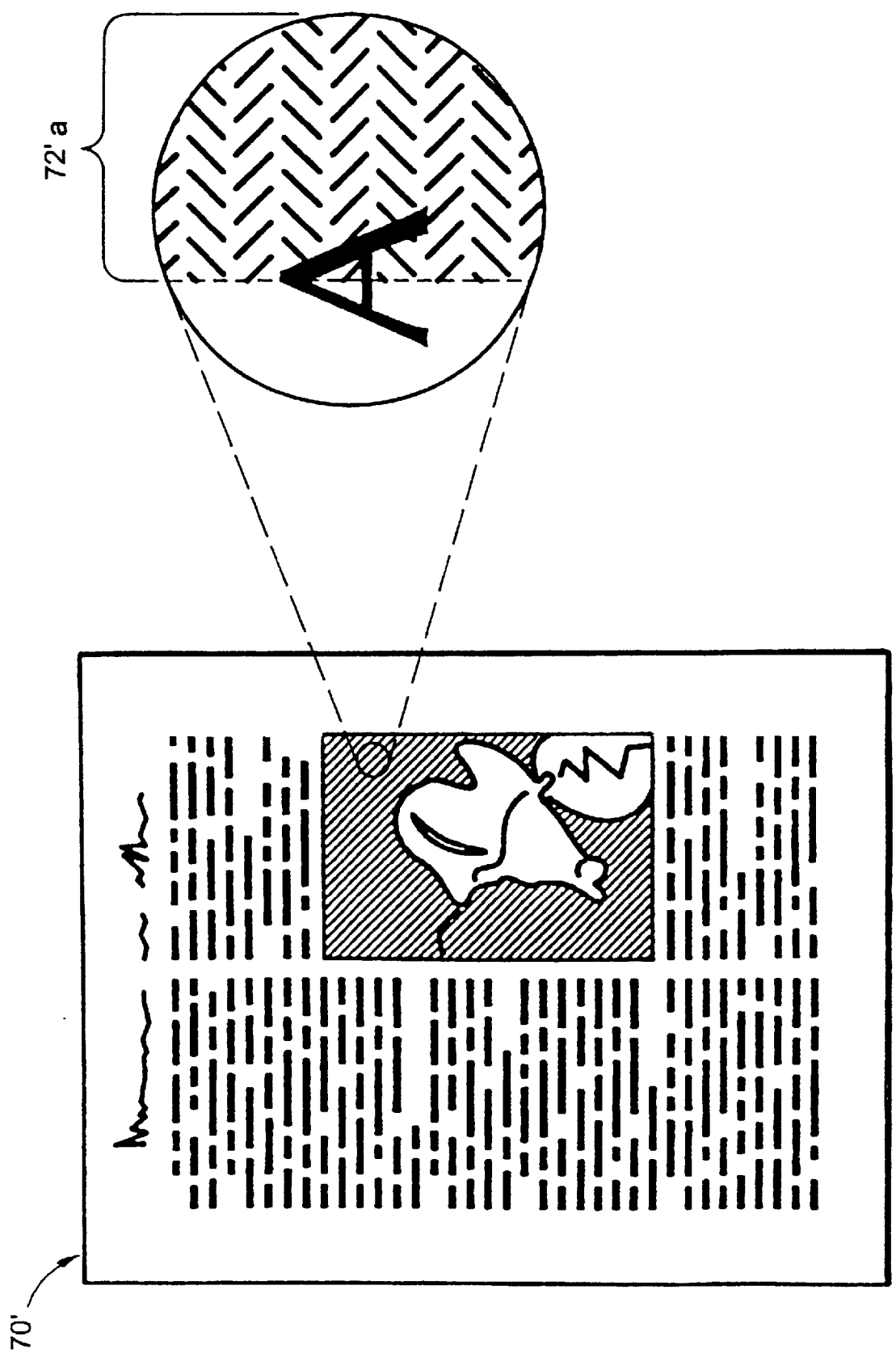
FIG. 5 is a replicated document of the source document of FIG. 4.

It is noted that in FIGS. 2 and 3, the original glyph code and the added or new glyph code is located in predetermined gray areas of a document and that the glyph code of FIG. 5 is entered in an appropriate location on a pictorial image. It is to be appreciated that either of the above embodiments may be used in either a predefined glyph code area or as part of an image determined to be appropriate by glyph detector 32. It is also noted that the source document may consist of one or more hardcopy documents, or one or more electronic documents or a combination of hardcopy and electronic documents.

One benefit of the subject invention is the use of the first and second embodiments to generate digital watermarks. Digital watermarking is one method which has been set forth as a manner to identify the owner, creator, developer, distributor or authorized user of a document or image. The object of a digital watermark is to provide a permanent mark on the image to allow a clear identification as to its origin. The digital watermark then being used to prove a claim a ownership, the payment of copyright revenues, or enforcement of legal rights, etc. Watermarking has also been proposed as a method to trace images that have been illicitly distributed. By using digital watermarking, it is possible to uniquely mark each rendition of a document for every buyer. Therefore, if a buyer makes an illicit copy, the copy itself identifies the buyer as the source.

In one form, a digital watermark is incorporated in a document such that it can be read by the unaided human eye, very similar to existing impression type watermarks. In addition to a human readable watermark, using the teachings of the subject invention it is also possible to embed machine readable watermarks as part of a document.

The present invention facilitates the use of digital watermarking by providing the capability of combining human readable and machine readable watermarks in a document. Particularly, by using the quasi-reprographic system disclosed above, digital watermarking as illustrated in FIGS. 6–8 can be accomplished.

Figure 6:
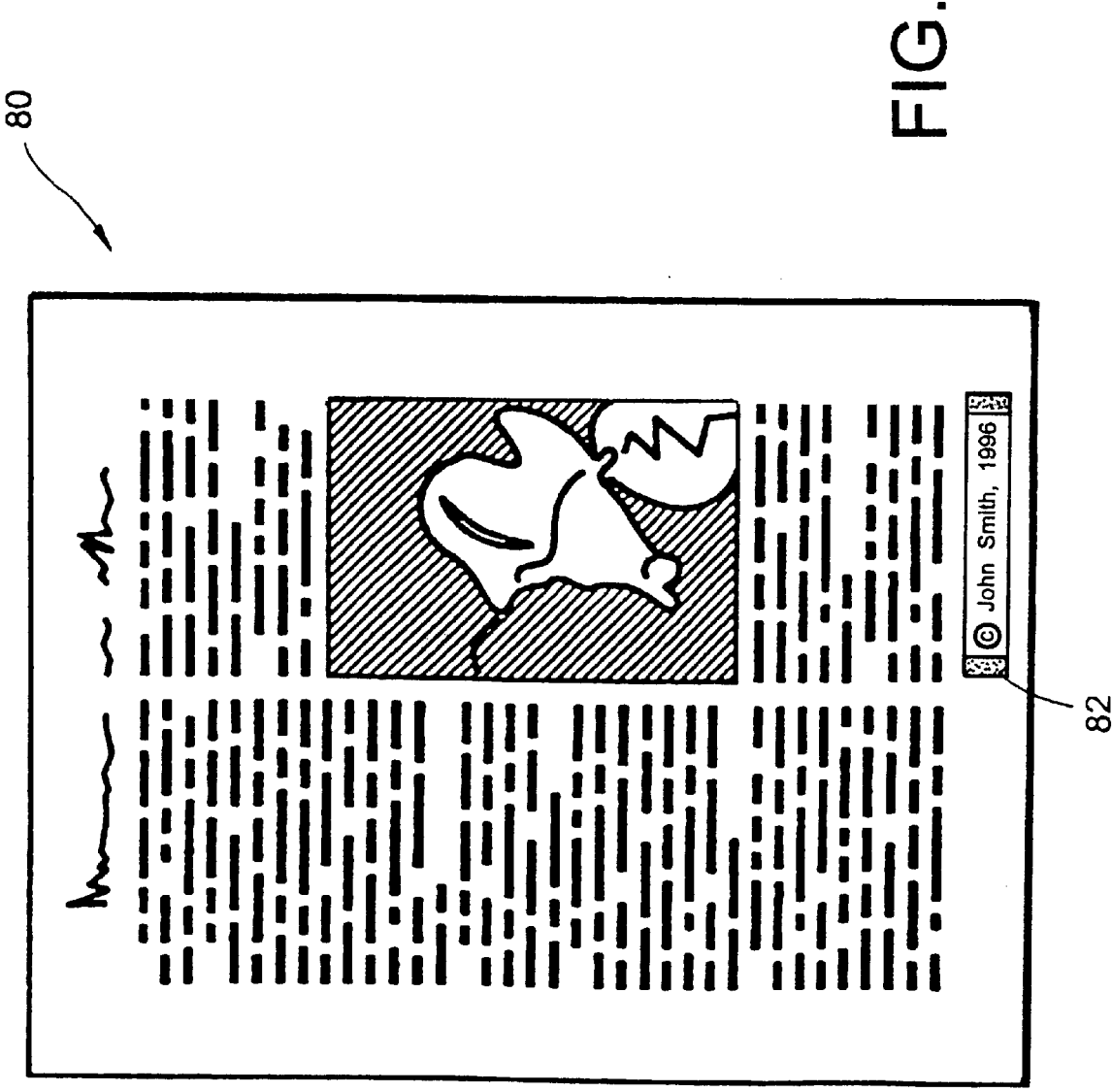
FIG. 6 illustrates a source document to which is applied a digitized watermark; and, FIGS. 7 and 8 illustrate replicated documents of the source document of FIG. 6 including digitized watermarks.

FIG. 6 illustrates a source document 80 configured to include a human readable watermark, such as copyright notice, "© John Smith, 1996", 82, located at the bottom of the document. It is appreciated that human readable watermarks are commonly incorporated into a document in a manner more inconspicuous than watermark 82, and also are commonly integrated within text and/or images of the document. Such concepts are taught for example in commonly assigned patent applications to Curry, "Method and Apparatus for Generating Serpentine Halftone Images", U.S. Pat. No. 5,706,099 issued on 6 Jan. 1998. and Curry, "Method and Apparatus for Generating Halftone Images Having Patterns Formed Therein", U.S. Pat. No. 5,710,636 issued on 20 Jan. 1998. both hereby incorporated by reference. Watermark 82 of FIG. 6 is shown more conspicuously and separate from the text and image of document 80' to increase the ease with which the concepts of the present invention may be explained, however, it is to be appreciated the present invention may also be used with inconspicuous incorporated type watermarks.

Figure 7:
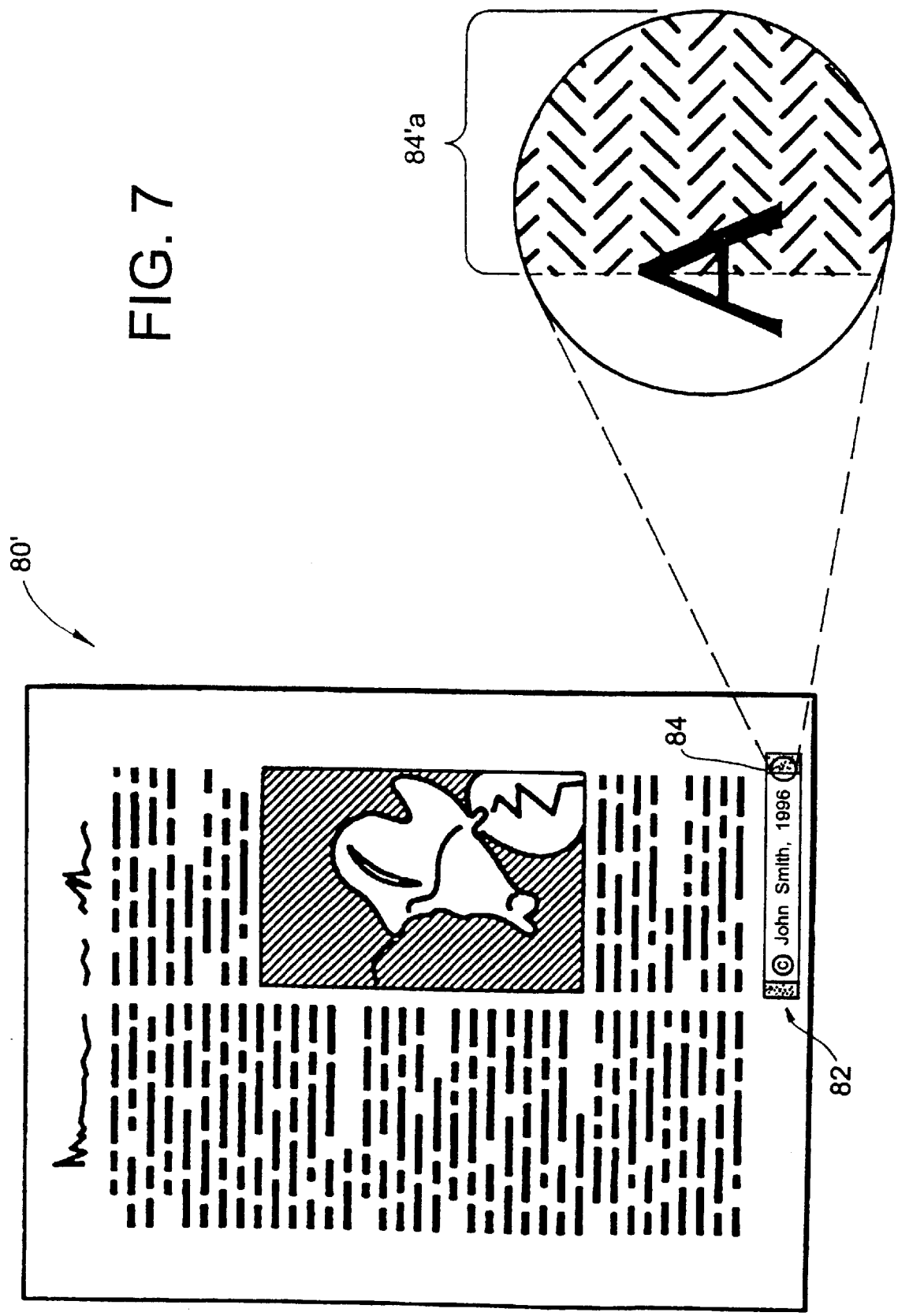
Figure 8:
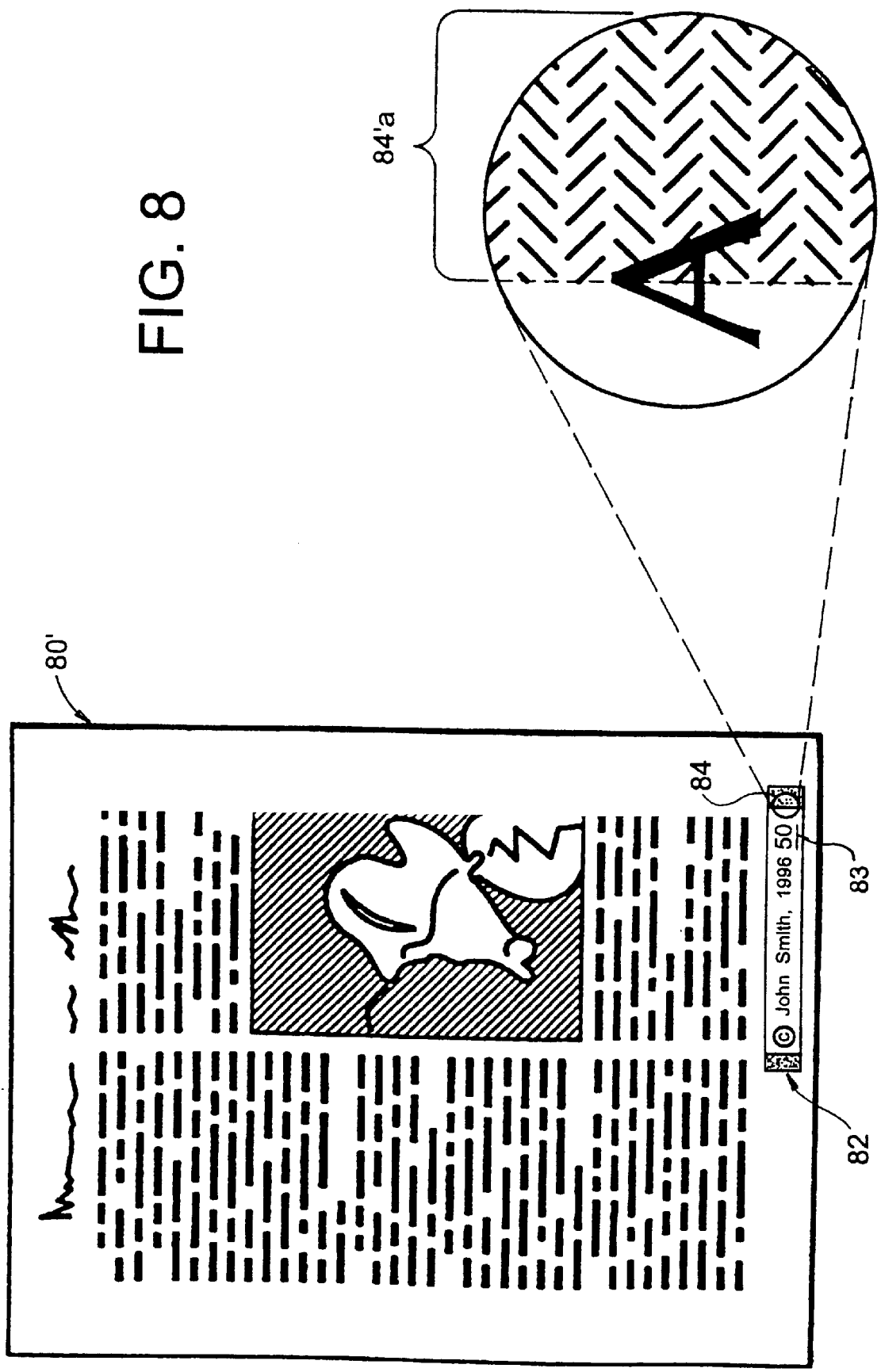

FIG. 7 illustrates that human readable watermark 82 can be configured of glyph codes such that at a selected location 84 of human readable watermark 82, a glyph code pattern is embedded 84'a, containing information relevant to that particular copy of the document 80', e.g. such as an indication payment has been made for the copy, etc., or to other types of information.

It is also to be understood, that by using the quasireprographic concepts of the present invention, it is possible to add additional embedded data in the image section and/or other areas of document 80', as accomplished for example in connection with FIG. 5 (72'a), in addition to or in place of data 84'a. In this manner, it one were attempting to illicitly copy a document and altered or cut off the human readable watermark 82 (which would include area 84), unbeknown to the illicit user, machine readable watermarks may still be embedded within the image section and/or other areas of document 80'.

FIG. 8 illustrates a situation where document 80' is used in a system where, in addition to machine readable watermark 82, there is a human readable indication 83 which can be altered during each copy process. For example, in FIG. 8 the copyright notice 82 is maintained and visual indication 83 of the number of copies is also provided, e.g. this is copy "50" of document 80'. The next reproduction thereby being document reproduction "51", which will also be indicated visually on the document.

Thus, FIG. 8 illustrates that it is possible to provide a visually changing indication 83 which uses a glyph code pattern so that machine readable data 84'a may also be embedded therein. It is to be appreciated that while section 82 has been added, and section 83 is disclosed as being altered from one copy to a next copy, the overall appearance of the document nevertheless remains substantially unchanged.

As also noted in the discussion of FIG. 7, a machine readable watermark can also be embedded in an image of the document and/or at other areas in the document to provide additional protection against a user who eliminates the human readable watermark.

In both FIGS. 7 and 8 the embedded data 84'a is the same e.g. "A". However, it is to be appreciated that the embedded data can of course be changed upon a reproduction of the document, as taught by the present quasi-reproduction system.

A benefit of providing a human readable and machine readable watermark on the same document is to give a visual notification to a user that certain rights exist in the document being reproduced, while maintaining the capability of confidentially tracking illicit users.

Thus, the teachings of the present invention are also shown to be applicable in the areas of copyright compliance certification, ownership labelling, audit trails of single and multi-generation copying, copy routing information, copier identification, time stamping, finishing instructions and individualized commentaries.

It is, therefore, apparent that there is provided, a method and apparatus for producing documents quasi-reprographically such that data discernible by the human eye appears substantially visually identical to a source document while machine readable data is altered.

While this invention has been described in conjunction with the preferred embodiments thereof, it is evident that many alternatives, modifications, and variations will be apparent to those skilled in the art. Accordingly, it is intended to embrace all such alternatives, modifications and variations that fall within the spirit and scope of the appended claims.

I claim:

1. A quasi-reprographic apparatus comprising:
   a document input configured to receive and digitize a source document which is in a fixed format;
   a document storage in operative connection with the document input, configured to store the digitized version of the source document;
   an embedded code detector in operative connection with the document storage, configured to detect locations in the digitized document appropriate for holding embedded machine readable code and to determine whether embedded machine readable code exists in the digitized document;
   an embedded code decoder in operative connection with the embedded code detector, configured to decode embedded machine readable code detected by the embedded code detector;
   a control unit, including a control memory, a processor and a control device, in operative connection with the embedded code decoder, the control unit configured (i) to receive data representing the decoded embedded code and its location in the digitized document, data indicating that no embedded code exists in the digitized document, and data representing an area in the digitized document appropriate for insertion of embedded code, the area appropriate for insertion of the embedded code being an area of uniform color on the source document, (ii) to process the decoded embedded code, (iii) to generate additional data for insertion into the digitized document as embedded code in accordance with instructions stored in the control unit; and (iv) to determine whether the area appropriate for insertion of the embedded code is sufficiently sized to hold the additional data such that the area of uniform color will be visually unaltered upon a hardcopy reproduction of the source document;
   an embedded code encoder in operative connection with the control unit and the document storage, configured to receive the additional data from the control unit, to transform the additional data into additional embedded code and, to insert the additional embedded code at a selected location in the digitized document; and,
   an output device for outputting a hardcopy reproduction of the digitized document having the additional embedded code.

2. The quasi-reprographic system according to claim 1 further including a data input device for inputting data to the control unit, for use in processing data received from the embedded code decoder.

3. The quasi-reprographic system according to claim 1 wherein the source document contains at least one of machine readable and human readable data.

4. The quasi-reprographic system according to claim 1 wherein the embedded code is a self-clocking glyph code which is an integral part of an image in the source document.

5. The quasi-reprographic system according to claims 1 further including at least one of (i) a pointer inserted into the digitized document and reproduced in the hardcopy reproduction, the pointer constructed to point to a memory area holding a portion of the additional data which was determined to be of a size greater than what could be held in the appropriate area of the digitized document, such that the area of uniform color is unaltered upon a hardcopy reproduction of the source document, and to point to instructions resulting in the printing of an appendage document holding the portion of the additional data which was determined to be of a size greater than what could be held in the appropriate area of the digitized document such that the area of uniform color is unaltered upon a hard copy reproduction of the source document (ii) a means for reducing an amount of error correction which is part of the embedded data.

6. The quasi-reprographic system according to claim 1 further including means for printing a human readable digital watermark, on a hardcopy reproduction of the source document.

7. The quasi-reprographic system according to claim 6 wherein a machine readable watermark is included as part of the human readable watermark.

8. A method of generating a hardcopy reproduction of a source document using a reprographic apparatus having quasi-reprographic capabilities, comprising the steps of:
   digitizing the source document;
   storing the digitized source document in a document storage;

detecting locations in the digitized document appropriate for holding embedded machine readable code and determining whether embedded machine readable code exists in the digitized document;

decoding embedded machine readable code detected in the determining step;

selectively generating information representing (i) detected embedded machine readable code and its location in the digitized document (ii) that no embedded code was detected in the digitized document and (iii) an area appropriate for insertion of embedded code in the digitized document, the area appropriate for insertion of the embedded code being an area of uniform color on the source document;

transmitting the selectively generated information to a control unit;

processing the transmitted information within the control unit to generate at least one of new and additional data for the digitized document;

encoding at least one of the new and additional data into at least one of new and additional embedded code;

determining whether or not the area appropriate for insertion of the embedded code is sufficiently sized to hold the new or additional data such that the area of uniform color is visually unaltered upon a hardcopy reproduction of the source document;

inserting at least one of the new and additional embedded code at the area appropriate for insertion of the embedded code in the digitized documents when it is determined the area appropriate for insertion of the embedded code is of a sufficient size; and generating a hardcopy reproduction of the source document.

9. The method according to claim 8 wherein the embedded code is a graphical machine readable code.

10. The method according to claim 8 wherein the embedded code is a self-clocking glyph code which is an integral part of an image in the source document.

11. The method according to claim 8 further including:

inputting external data to the quasi-reprographic process from a source external to the reprographic apparatus; and using the inputted data in the processing steps to generate at least one of the new and additional data for the digitized document.

12. The method according to claim 8 wherein the step of inserting further includes replacing the embedded code detected in the detecting step with the new or additional embedded code at the location of the replaced embedded code.

13. The method according to claim 8 wherein the new or additional embedded data is inserted into the hardcopy reproduction automatically, without operator intervention, and without operator knowledge.

14. The method according to claim 8 wherein the source document holds at least one of machine readable and human readable data in a fixed format.

15. The method according to claim 8 further including producing a plurality of reproductions of the source document, wherein at least one of the plurality of reproductions has embedded code different from another one of the plurality of reproductions.

16. The method according to claim 8 further including, during the processing step, generating data representing a human readable watermark; encoding the data representing the human readable watermark using the embedded code; and, inserting the generated data, coded with the embedded code, in the digitized document, such that when the hardcopy reproduction is generated, the human readable watermark is generated in addition to any image and data originally on the source document.

17. The method according to claim 16 wherein an appearance of the human readable watermark is altered from a first reproduction of the source document to a second reproduction of the source document.

18. The method according to claim 8 further including at least one of (i) inserting a pointer into the digitized document and reproducing the pointer in the hardcopy reproduction, the pointer pointing to a memory area holding a portion of one of the new and additional data which was determined to be of a size greater than what could be held in the appropriate area of the digitized document such that the area of uniform color is unaltered upon a hardcopy reproduction of the source document, and (ii) pointing to instructions resulting in the printing of an appendage document holding the portion of one of the new and additional data which was determined to be of a size greater than what could be held in the appropriate area of the digitized document such that the area of uniform color is unaltered upon a hard copy reproduction of the source document (ii) reducing an amount of error correction which is part of the embedded data.

* * * * *